(12) United States Patent
Choi

(10) Patent No.: US 7,090,710 B2
(45) Date of Patent: Aug. 15, 2006

(54) AIR INTAKE DUCT FOR VEHICLE

(75) Inventor: Jae-Sik Choi, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 10/749,220

(22) Filed: Dec. 30, 2003

(65) Prior Publication Data
US 2005/0048906 A1    Mar. 3, 2005

(30) Foreign Application Priority Data
Sep. 3, 2003   (KR) .................... 10-2003-0061476

(51) Int. Cl.
*B60H 3/06* (2006.01)
*B60H 1/00* (2006.01)

(52) U.S. Cl. .................... 55/385.3; 55/481; 55/506; 55/480; 55/478; 55/503; 55/504; 454/156; 454/158; 123/198 E; 123/184.21; 123/184.22; 123/184.23; 123/184.24; 123/184.38; 123/184.41

(58) Field of Classification Search ............... 55/385.3, 55/481, 506, 480, 478, 503, 504; 454/156, 454/158; 123/198 E, 184.21, 184.22, 184.24, 123/184.38, 184.41
See application file for complete search history.

(56) References Cited

U.S. PATENT DOCUMENTS

| 5,613,991 | A | * | 3/1997 | Esaki et al. ................. 55/385.3 |
| 5,722,357 | A | * | 3/1998 | Choi ...................... 123/184.21 |
| 6,136,057 | A | * | 10/2000 | Dang et al. ................. 55/385.3 |
| 6,355,077 | B1 | * | 3/2002 | Chittenden et al. ......... 55/385.3 |
| 6,641,636 | B1 | * | 11/2003 | Willig et al. ............... 55/385.3 |
| 6,840,221 | B1 | * | 1/2005 | Rowells et al. ............. 123/456 |

FOREIGN PATENT DOCUMENTS

| DE | 33 17 851 A1 | 11/1984 |
| DE | 40 21 460 A1 | 1/1992 |
| GB | 2 275 768 A1 | 9/1994 |
| JP | 10-16532 | 1/1998 |

* cited by examiner

Primary Examiner—Minh-Chau T. Pham
(74) Attorney, Agent, or Firm—Morgan Lewis & Bockius LLP

(57) ABSTRACT

An air intake duct for a vehicle having a cuttable groove at an external wall of an air exhaust port can be applied to any vehicle regardless of whether an air filter is adopted, thus providing cost-effectiveness, preventing air leakage when the air filter is not used, and increasing the air-conditioner/heater function of the vehicle.

10 Claims, 4 Drawing Sheets

AIR INTAKE DUCT FOR VEHICLE

CROSS-REFERENCE TO RELATED APPLICATIONS

This application claims priority of Korean Application No. 10-2003-0061476, filed on Sep. 03, 2003.

FIELD OF THE INVENTION

The present invention relates to an air intake duct for a vehicle that takes in outside air or inside air of the vehicle and provides it to an air-conditioning unit. More particularly, the present invention relates to an air intake duct adapted to be optionally installed with an air filter thereto.

BACKGROUND OF THE INVENTION

Generally, air can enter the passenger compartment of a vehicle through an air-conditioner evaporator or a heater-core. The air provided to either the evaporator or heater-core is delivered via a blower motor through the air intake duct selectively inhaling the outside air or inside air of the vehicle.

An air filter is further added to some vehicles to purify air delivered from the air intake duct via the blower motor.

SUMMARY OF THE INVENTION

Embodiments of the present invention provide an air intake duct for a vehicle useable in any vehicle regardless of whether an air filter is adopted, thereby reducing the cost of manufacturing, preventing air leakage when the air filter is not equipped, and optimizing the operation of the air-conditioner/heater inside the vehicle.

In a preferred embodiment of the present invention, an air intake duct for a vehicle comprises an air exhaust port having a cross-section of rectangular shape. A cuttable groove is formed at an external wall of the air exhaust port for inserting an air filter into the air intake duct through a hole formed by cutting out the groove.

BRIEF DESCRIPTION OF THE DRAWINGS

For a better understanding of the nature and objects of the present invention, reference should be made to the following detailed description with the accompanying drawings, in which.

DETAILED DESCRIPTION OF THE PREFERRED EMBODIMENTS

A preferred embodiment of the present invention will now be described in detail with reference to the attached drawings.

Figure 1:
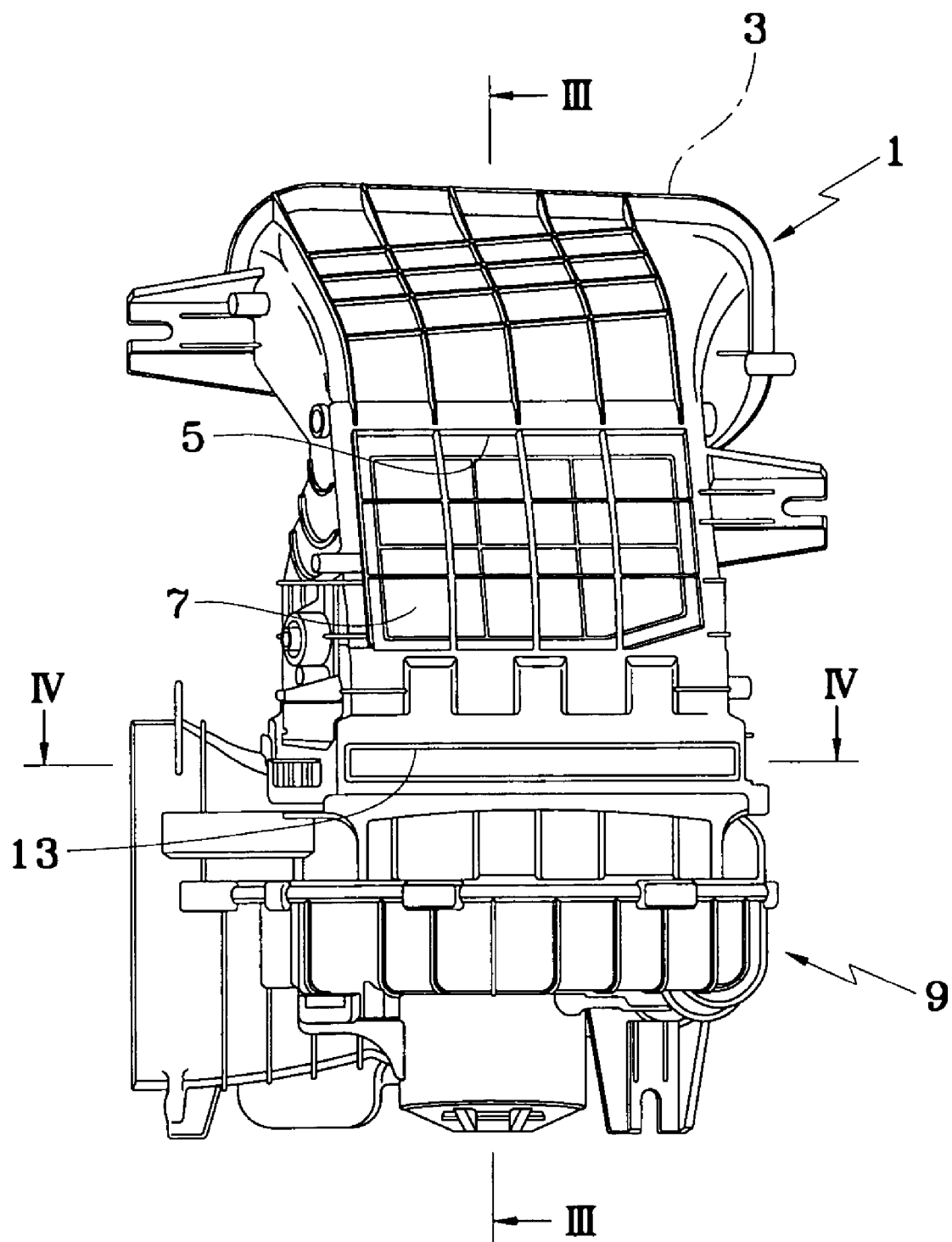
FIG. 1 is an outer view illustrating an air intake duct for a vehicle in accordance with an embodiment of the present invention.
Figure 2:
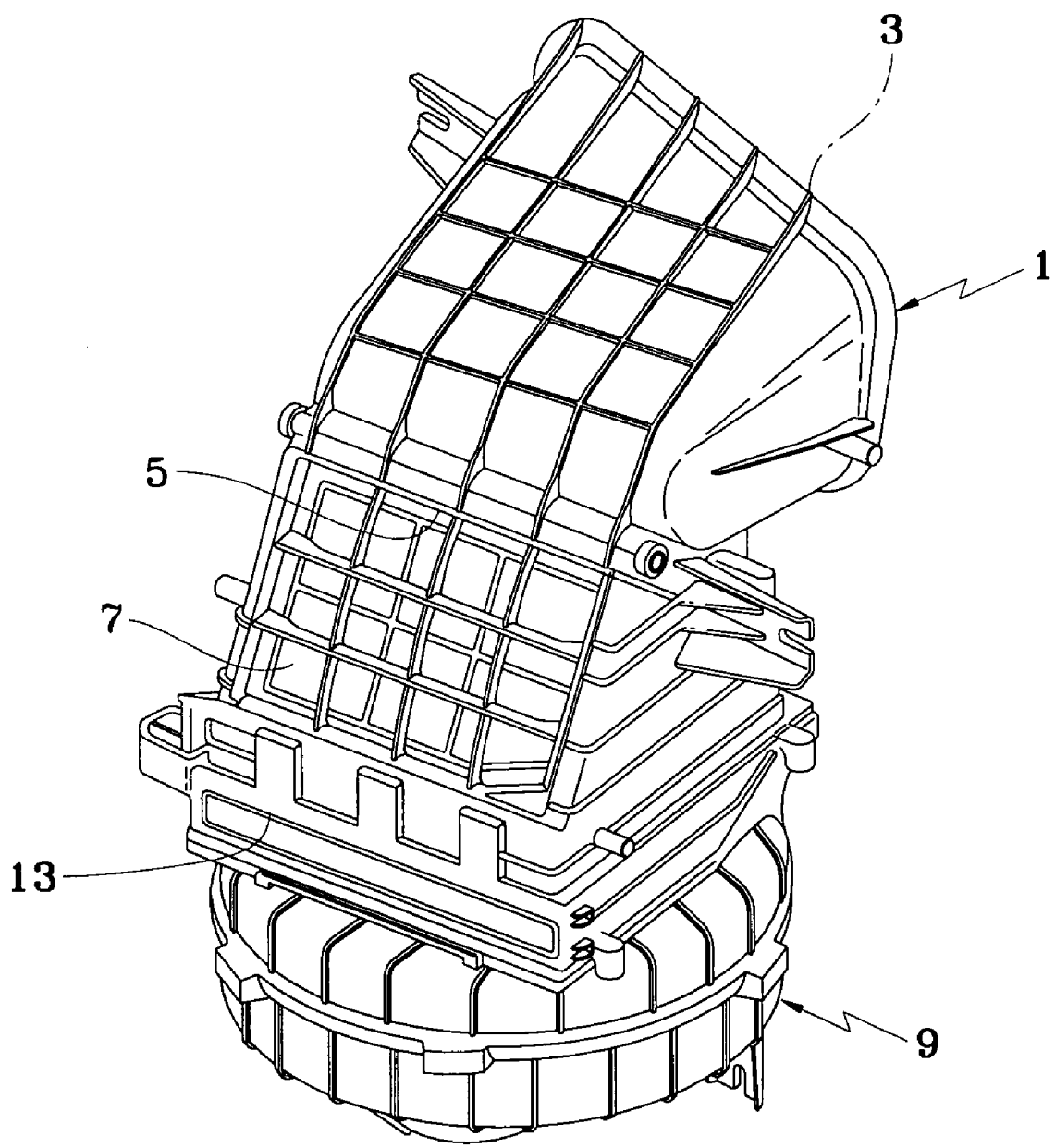
FIG. 2 is a perspective view of the air intake duct of FIG. 1 when observed from the right upper side of the air intake duct.
Figure 3:
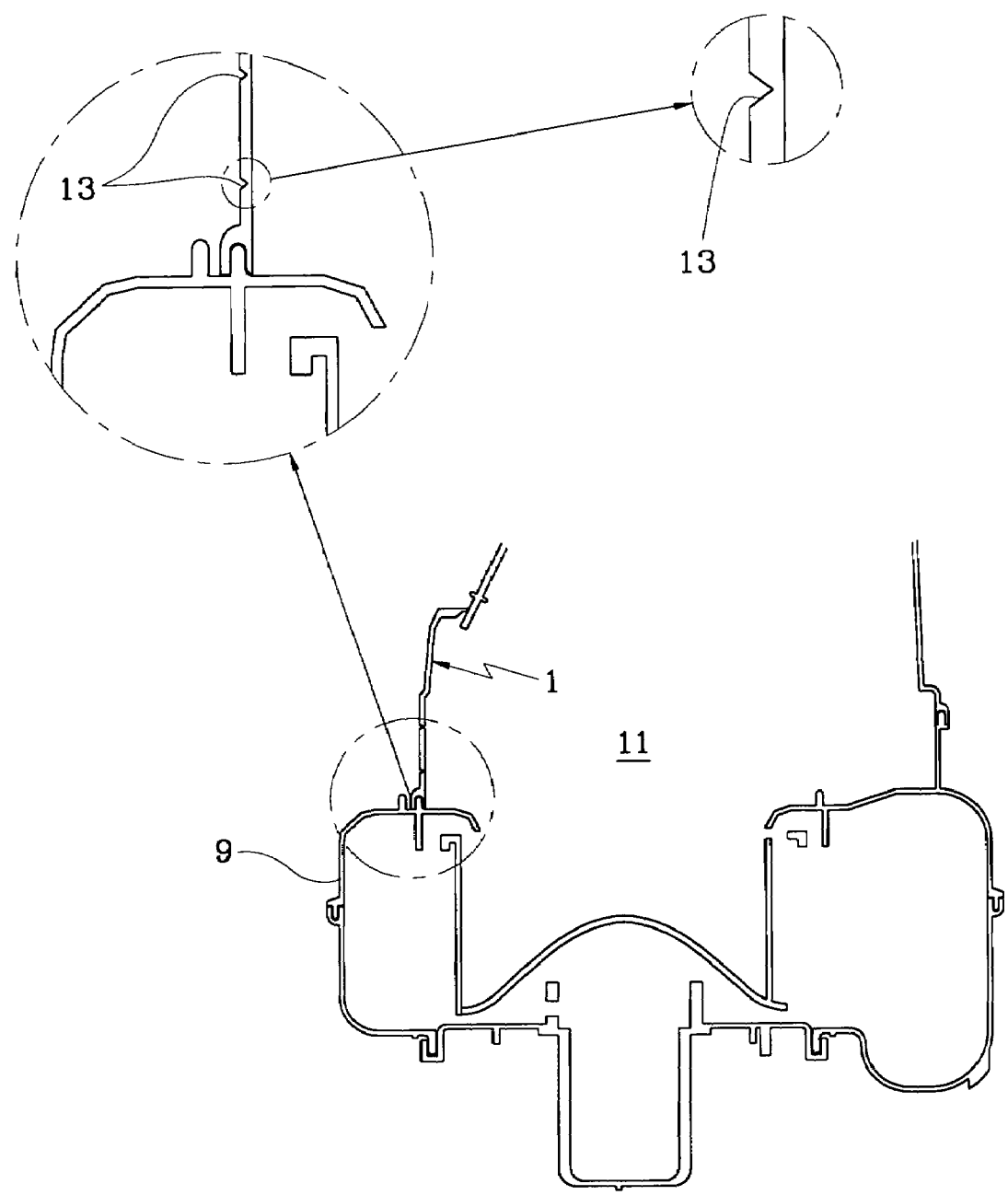
FIG. 3 is a cross-sectional view taken along line III—III of FIG. 1.

As shown in FIGS. 1 and 2, an air intake duct 1 comprises an outside air inlet 3 and an inside air inlet 5. A flap door 7 selectively opens the outside air inlet 3 and inside air inlet 5. An air exhaust port 11 (see FIG. 3) having a cross-section of an approximately rectangular shape is coupled at an inlet portion of a blower housing 9 at the bottom of the air intake duct 1.

A cuttable groove 13 is formed at an external wall of the air exhaust port 11 of the air intake duct 1 for inserting an air filter into the air intake duct through a hole formed by cutting out the groove. The cuttable groove 13 is in the form of a continuous channel around a closed rectangular shape and is formed on the surface facing the insertion direction of the air filter.

Figure 4:
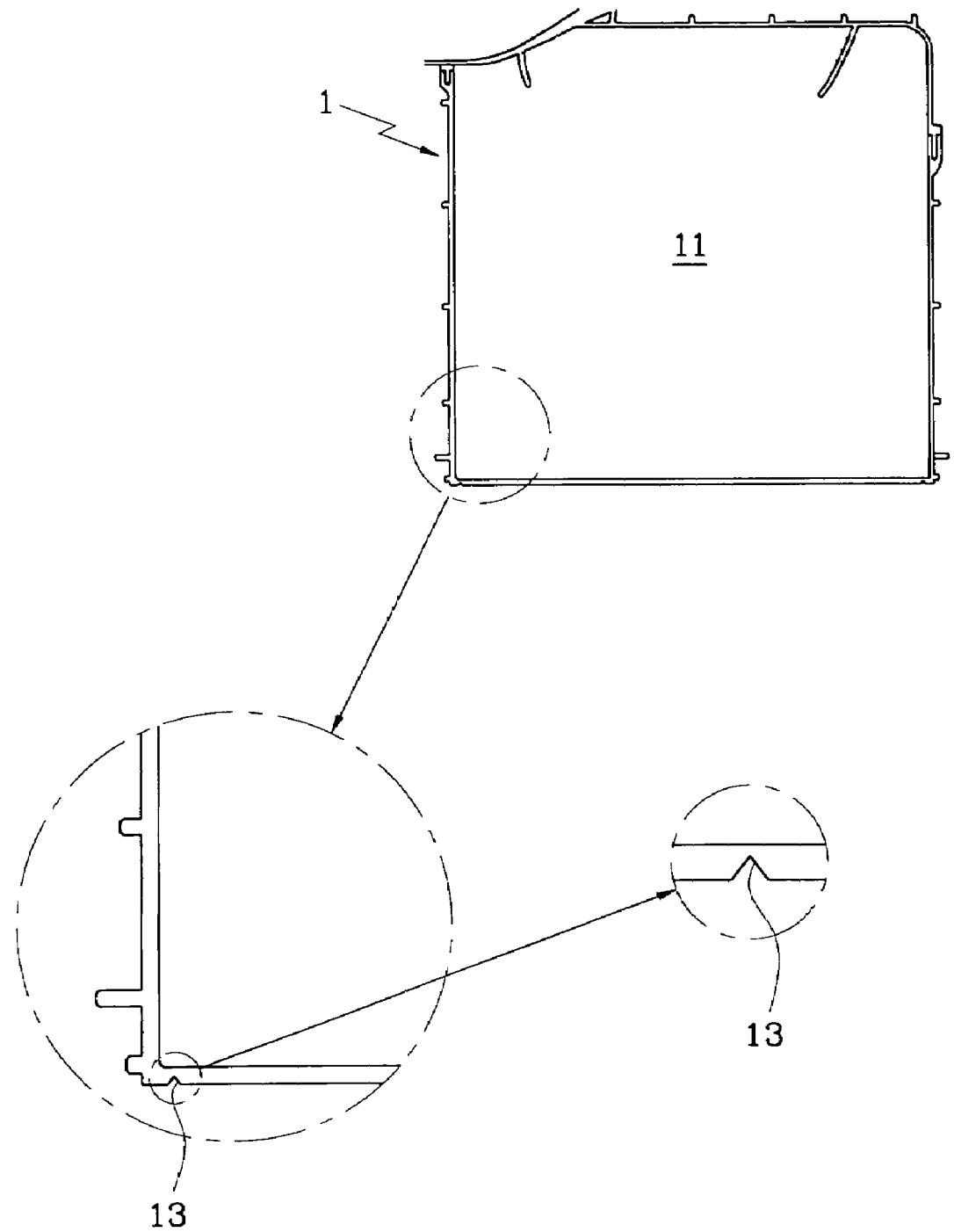
FIG. 4 is a cross-sectional view taken along line IV—IV of FIG. 1.

As shown in FIG. 4, the air exhaust port 11 of the air intake duct 1 has a cross-section of an approximately rectangular shape, and a detailed configuration of the cuttable groove 13 is illustrated in the enlarged portion of the drawing.

The cuttable groove 13 is preferably narrowed ¾ in relation to the wall thickness of the air intake duct 1 so that it can be easily cut out for insertion of an air filter, but it can also properly maintain constructional rigidity when no cutting work is applied.

In a vehicle having no air filter like the present invention, the air intake duct 1 constructed above is mounted without cutting out any portions of the external wall of the air exhaust port 11. When the cuttable groove 13 is not cut out, the groove remains sealed, thus preventing air leakage and contributing to an improvement of the air-conditioner and heater function of the vehicle.

Provided that an air filter is used in a vehicle, the external wall of the air intake duct 1 is partially cut out based on the cuttable groove 13, and the air filter is inserted into the hole formed thereby.

The air intake duct 1 according to the present invention can, therefore, be applied to any vehicle regardless of whether an air filter is adopted, thereby increasing the cost-efficiency and simplifying the usage of the duct component.

As apparent from the foregoing, there is an advantage in that the air intake duct for a vehicle according to the present invention can be used in any vehicle regardless of whether an air filter is used, resulting in the reduction of manufacturing costs and, particularly, an increase in cooling and heating inside the vehicle by preventing air leakage when the air filter is not fastened to the air intake duct.

What is claimed is:

1. An air intake duct for a vehicle, comprising:
   an air exhaust port having a cross-section of a rectangular shape; and
   a cuttable groove formed at an external wall of said air exhaust port for inserting an air filter into said air intake duct through a hole formed by cutting out said groove.

2. The duct as defined in claim 1, wherein said cuttable groove is in the form of a continuous channel around a closed rectangular shape and is formed on a surface facing the insertion direction of said air filter.

3. The duct as defined in claim 1, wherein said cuttable groove is dug in ¾ in relation to the wall thickness of said air intake duct.

4. The duct as defined in claim 1, wherein said air exhaust port is coupled to an inlet portion of a blower housing.

5. An air intake duct for a vehicle, comprising:
   an air exhaust port having an approximately rectangular cross-section; and
   a groove having an opening and a bottom that is more narrow than said opening, wherein said groove is dug into an external wall of said air exhaust port and said groove is configured for insertion of an air filter upon cutting out said bottom to form a hole in said external wall.

6. The duct as defined in claim 5, wherein said groove is in the form of a continuous channel around a closed rectangular shape and is formed on a surface facing the insertion direction of said air filter.

7. The duct as defined in claim 5, wherein said groove is dug in ¾ in relation to the wall thickness of said air intake duct.

8. The duct as defined in claim 5, wherein said air exhaust port is coupled to an inlet portion of a blower housing.

9. An air intake duct for a vehicle, comprising:
   an air exhaust port defined by a plurality of walls having inside surfaces and outside surfaces; and
   an air filter receiving portion formed on the outside surface of one said wall, said receiving portion comprising an inner wall portion surrounded by a peripheral groove, wherein said groove is formed in the outside surface of the wall such that the wall is thinned at the groove and said inner wall portion is configured and dimensioned to define an opening when removed that is adapted to receive an air filter.

10. The air intake duct of claim 9, wherein said peripheral groove extends into said wall by approximately ¾ of the wall thickness.

\* \* \* \* \*